United States Patent
Smith

[11] Patent Number: 5,884,894
[45] Date of Patent: Mar. 23, 1999

[54] INNER-LOOP VALVE SPOOL POSITIONING CONTROL APPARATUS

[75] Inventor: Brian Smith, Springville, Utah

[73] Assignee: Valtek, Inc., Springville, Utah

[21] Appl. No.: 700,194

[22] Filed: Aug. 20, 1996

[51] Int. Cl.⁶ .................................................. F15B 13/043
[52] U.S. Cl. ..................... 251/28; 137/625.64; 91/363 R; 91/365
[58] Field of Search .......................... 137/625.64; 91/365, 91/363 R; 251/28

[56] References Cited

U.S. PATENT DOCUMENTS

| | | | |
|---|---|---|---|
| 2,953,123 | 9/1960 | Reen et al. ...................... | 137/625.64 X |
| 4,310,143 | 1/1982 | Determan ........................ | 137/625.64 X |
| 4,456,031 | 6/1984 | Taplin . | |
| 4,481,768 | 11/1984 | Goshorn et al. . | |
| 4,516,230 | 5/1985 | Goodloe et al. . | |
| 4,593,719 | 6/1986 | Leonard ........................... | 137/625.64 X |
| 4,907,615 | 3/1990 | Meyer et al. .................... | 137/625.64 X |
| 4,980,617 | 12/1990 | Tajima . | |
| 5,012,722 | 5/1991 | McCormick . | |
| 5,073,091 | 12/1991 | Burgess et al. . | |
| 5,079,492 | 1/1992 | Takagi . | |
| 5,123,331 | 6/1992 | Hirai . | |
| 5,165,448 | 11/1992 | Handte ............................... | 137/625.64 |
| 5,184,055 | 2/1993 | Ohishi et al. . | |
| 5,184,578 | 2/1993 | Quinn et al. . | |
| 5,409,188 | 4/1995 | Takagi . | |
| 5,502,383 | 3/1996 | Funami et al. ........................... | 324/251 |
| 5,568,022 | 10/1996 | Tranovich . | |
| 5,586,435 | 12/1996 | Kokalis . | |

FOREIGN PATENT DOCUMENTS

| | | |
|---|---|---|
| 0 393 697 A2 | 10/1990 | European Pat. Off. . |
| 0 462 432 A2 | 12/1991 | European Pat. Off. . |
| 0 550 350 A1 | 7/1993 | European Pat. Off. . |
| WO 94/22777 | 10/1994 | WIPO . |

*Primary Examiner*—Kevin Lee
*Attorney, Agent, or Firm*—Killworth, Gottman, Hagan & Schaeff, L.L.P.

[57] ABSTRACT

A valve control system for positioning a valve in response to a command signal. The valve control system comprises a sensor for detecting the position of the valve and for generating an outer feedback signal, a valve location command circuit for comparing the command signal to the outer feedback signal to generate a correction signal, an actuator for positioning the valve in response to pneumatic pressure, a spool slidably disposed within a block to direct pneumatic pressure to the actuator, a spool positioning device for moving the spool to a desired position, a spool sensor for detecting the current position of the spool and generating an inner feedback signal, and a spool location command for comparing the correction signal to the inner feedback signal to generate a spool positioning signal to direct the spool positioning device to move the spool to the desired position.

5 Claims, 6 Drawing Sheets

INNER-LOOP VALVE SPOOL POSITIONING CONTROL APPARATUS

BACKGROUND OF THE INVENTION

1. Field of the Invention

This invention relates to a valve control system to position a valve in response to an electrical command signal.

2. State of the Art

Valve control systems typically position a valve in response to a command signal, generally an electrical signal generated outside the valve control system. The current level of the electrical signal represents the desired position of the valve. For example, many valve control systems respond to command signals that vary between 4 to 20 milliamperes, with 4 milliamperes representing the valve in the fully closed position, 20 milliamperes representing the valve in the fully opened position, and a signal between 4 and 20 milliampere linearly representing a partially opened (or closed) valve.

Many valve control systems also include a valve sensor for detecting the position of the valve and generating an electrical feedback signal representing the present position of the valve. A command circuit compares the electrical feedback signal to the command signal and generates a correction signal. The correction signal, after processing, directs an electro-pneumatic device, such as the block and spool described in the detailed description below, to direct pressure to a pneumatic actuator that physically moves the valve to the desired position.

Present valve control systems have a lag time between the receipt of the command signal and the actual placement of the valve. The present systems also have an inability to precisely hold a valve in a partially opened position in response to a proper command signal. There is a need for an improved valve control system with a quicker response time and improved position control.

SUMMARY OF THE INVENTION

It is an object of the invention to provide an improved valve control system with a rapid response time.

It is also an object of the invention to provide such a valve control system with improved position control.

It is a further object of the invention to provide such a valve control system with low power requirements.

It is another object of the invention to provide a valve control system that is compatible with electronic position control circuits and programs now available.

The above and other objects of the invention are realized in a valve control system having a valve sensor for detecting the present position of the valve, positioned in response to a command signal, and generating an outer feedback signal representing the present position, a valve location command element for comparing the command signal to the outer feedback signal to generate a correction signal, an actuator to position the valve in response to pneumatic pressure, a block and spool, with the spool slidably disposed within the block to direct the pneumatic pressure to the actuator, a spool positioning element for moving the spool to a desired position to direct the pneumatic pressure to the actuator, a spool sensor for detecting the present position of the spool and generating an inner feedback signal representing the present position of the spool, and a spool location command element for comparing the correction signal to the inner feedback signal to generate a spool positioning signal to direct the spool positioning element to move the spool to the desired position. The inner loop feedback system, including the spool sensor, the spool location command element, and the spool positioning element, give this control system superior performance over the prior art, including reduced power consumption and improved valve position control.

BRIEF DESCRIPTION OF THE DRAWINGS

The above and other objects, features and advantages of the invention will become apparent from a consideration of the following detailed description presented in connection with the accompanying drawings in which.

DETAILED DESCRIPTION

Figure 1:
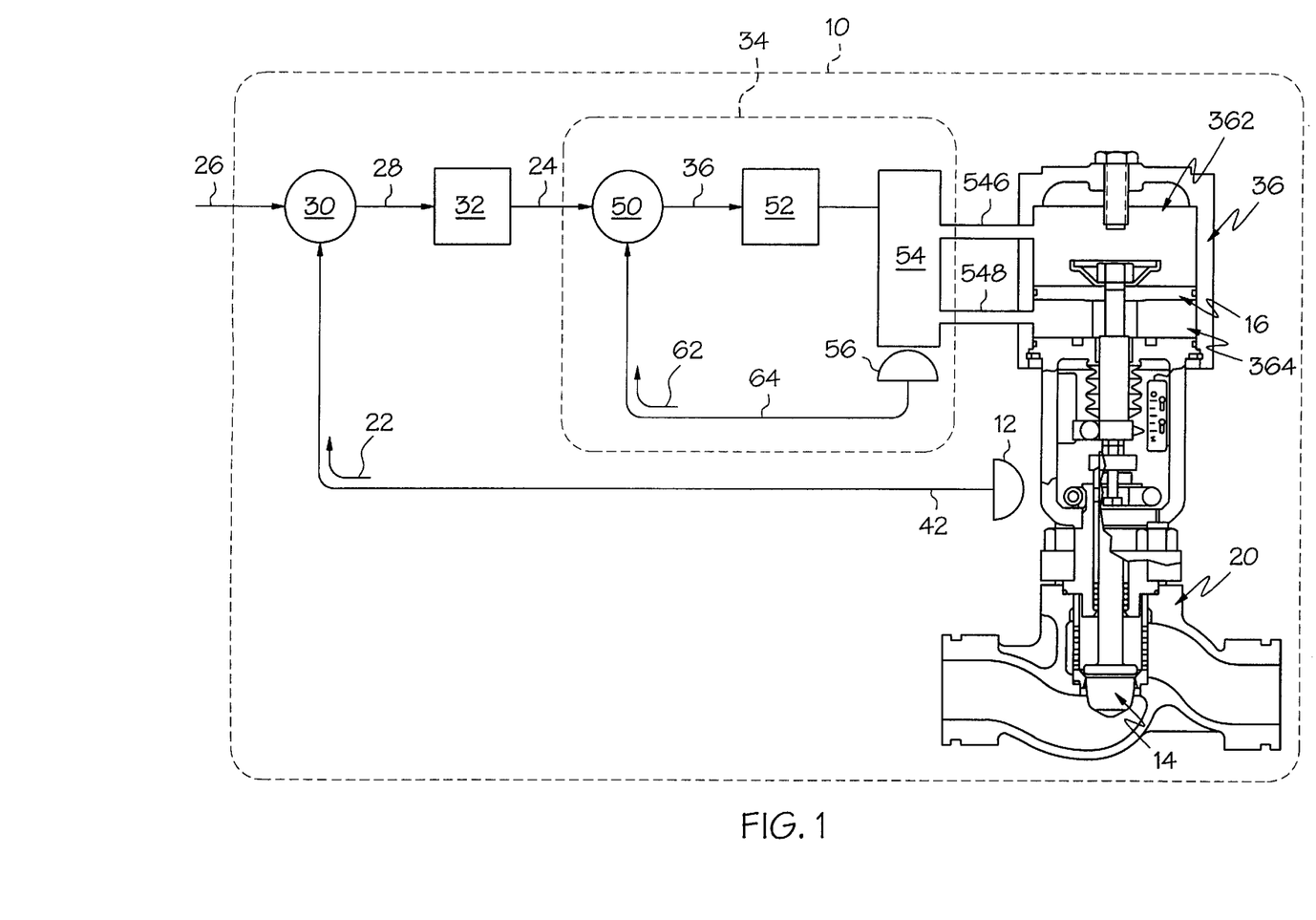
FIG. 1 shows a block diagram of a valve control system with the inner-loop control made in accordance with the present invention.

FIG. 1 shows an illustrative embodiment of a valve control system 10 for controlling a valve 14 which blocks or passes the flow of a fluid, such as oil, fuel, gas or water, through a pipe 20 or other passage. In response to an outside generated command signal 26, the valve control system 10 positions and holds the valve 14 in an opened, partially opened or partially closed, or closed position, as directed by the command signal.

The valve control system 10 includes a command circuit 30, a P.I. control circuit 32, an inner-loop control circuit 34, and an actuator 36. The actuator 36 is a pneumatic device that physically holds the valve 14 in its opened, partially opened, partially closed, or closed position. The command circuit 30, the P.I. control circuit 32, and the inner-loop control circuit 34 include electrical circuits to process the command signal 26, compare it to the actual location of the valve, and generate a signal to a block and spool mechanism 54 that controls the operation of the actuator 36.

The command signal 26 is generated outside the valve control system 10 and defines a desired position of the valve 14. The command signal 26 may be generated by a computer or another control system. One conventional standard for valve control involves a command signal that varies between 4 to 20 milliamperes, with 4 milliamperes representing the valve in the fully closed position, 20 milliamperes representing the valve in the fully opened position, and a signal between 4 and 20 milliampere linearly representing a partially opened (or closed) valve. Another standard involves a command signal with 20 milliamperes being the closed position and 4 milliamperes being the open system. This invention is not limited to a 4 to 20 milliampere command signal range and various other standards for the command signals could be used.

A typical command signal waveform includes a step increase from 4 milliamperes to 20 milliamperes to quickly open the valve from a closed position or a step decrease to quickly close the valve. Another typical command signal waveform comprises a ramp increase where the signal linearly increases to slowly open the valve or linearly decreases to slowly close the valve. However, the command signal may include patterns other than a step or a ramp.

Referring again to FIG. 1, an outer-loop sensor 12 detects the actual position of the valve 14 and generates an outer-loop feedback signal 22 that is supplied through an outer feedback loop 42 to the command circuit 30. The command circuit 30 compares the outer-loop feedback signal 22 to the command signal 26 and generates a correction signal 28 which defines how the valve should move to be in the position required by the command signal.

A P.I. control circuit 32 processes the correction signal 28 to produce an output signal 24 which is proportional to a linear combination of the correction signal and the time integral of the correction signal. Instead of a P.I. control, a P.I.D. control may also be used to process the correction signal 28. A P.I.D. control is a control system where the output signal 24 is proportional to a linear combination of the correction signal, the time integral of correction signal, and the time rate-of-change of the correction signal.

The output signal 24 from the P.I. control circuit 32 or P.I.D. control circuit enters a spool command circuit 50 of the inner-loop control circuit 34 which also comprises a spool positioning circuit 52, and a block and spool mechanism 54 connected to the actuator 36. An inner-loop sensor 56 detects the position of the spool of the block and spool mechanism 54 and returns an inner-loop feedback signal 62 through a inner feedback loop 64 to the spool command circuit 50. The spool command circuit 50 compares the inner-loop feedback signal 62 to the output signal 24 from the control circuit 32 and generates a spool positioning signal 36 to move the spool of the block and spool mechanism 54 into the proper position. The inner-loop sensor 56 with inner feedback loop 64 gives the valve control system a faster response time to the command signal and more precise control of the valve position than is possible with prior art systems.

The block and spool mechanism 54 is a pneumatic device that uses pneumatic pressure to control the valve position through the actuator 36, although hydraulic pressure could also be used. A piston 16, attached to the valve 14, moves in response to a change in pneumatic pressure. As the pneumatic pressure in an upper chamber 362 above the piston increases, the piston 16 moves the valve 14 down towards the closed position. As the pneumatic pressure in a lower chamber 364 below the piston increases, the piston moves the valve up towards the open position. The block and spool mechanism 54 directs pneumatic pressure into or out of the upper chamber 362 through an upper output 546 and directs pneumatic pressure into or out of the lower chamber 364 through a lower output 548.

Figure 2:
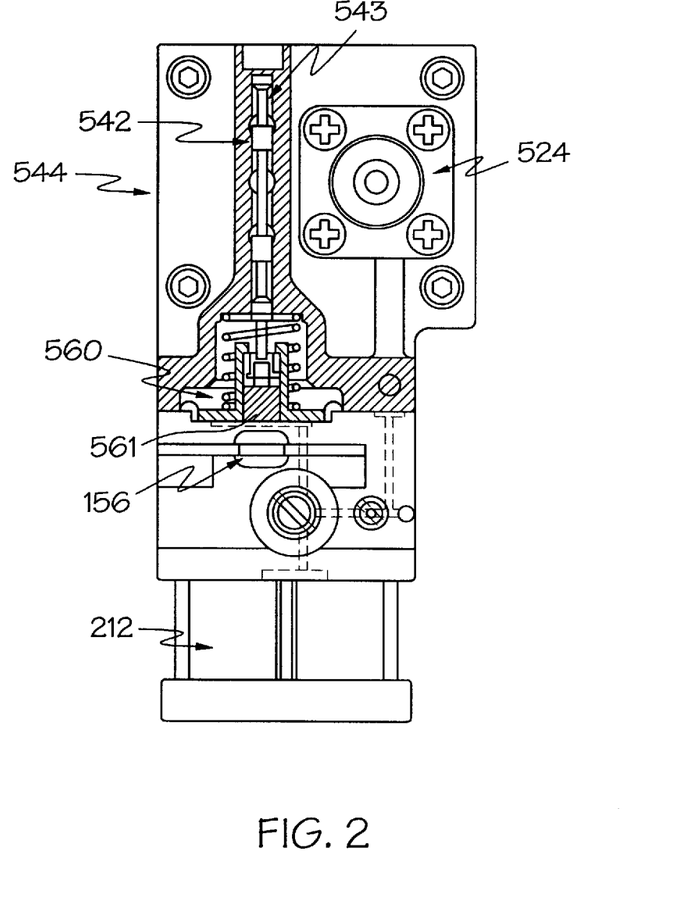
FIG. 2 shows a diagrammatic view of a block and spool mechanism suitable for use in the valve control system of FIG. 1.

FIG. 2 shows a more detailed schematic of the block and spool mechanism 54 to include a block 544 which houses a spool 542, the spool being slidably disposed within a spool chamber 543 of the block 544. The position of the spool 542, in relation to the position of the block 544, controls the pneumatic pressure flow through an upper output 546 and lower output 548, FIG. 1. The spool 542 is generally the counter shape of the spool chamber 543, but having lands 562 that block pneumatic pressure and passes 564 that pass pneumatic pressure FIG. 3A.

Figure 3A:
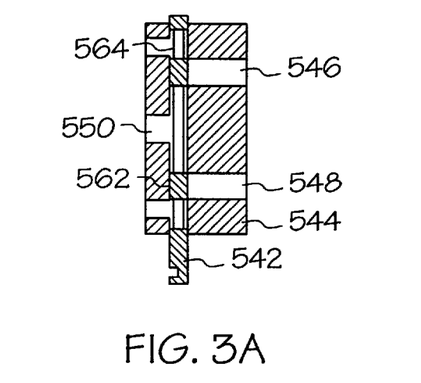
FIG. 3A shows the operation of the block and spool mechanism with the spool in the neutral position.
Figure 3B:
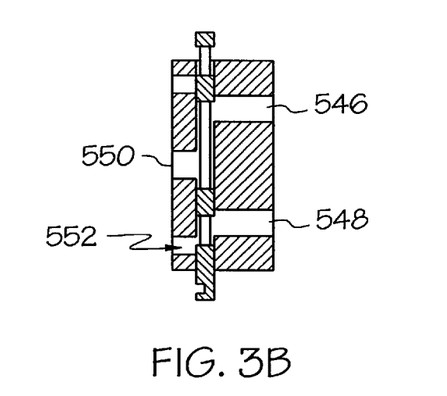
FIG. 3B shows the operation of the block and spool mechanism with the air flow directed to the low position.
Figure 3C:
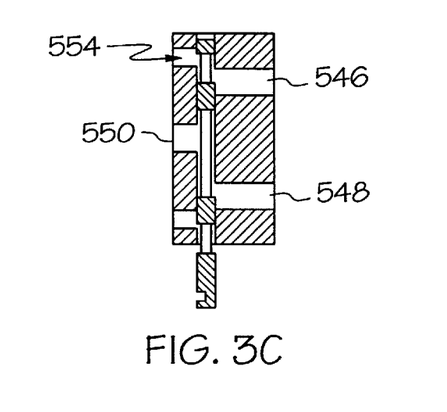
FIG. 3C shows the operation of the block and spool mechanism with the air flow directed to the high position.

FIGS. 3A, 3B, and 3C illustrate the operation of the block and spool 54. Pneumatic pressure is supplied through an input 550. When the spool is in the neutral position shown in FIG. 3A, the spool 542 blocks the pneumatic flow to the upper output 546 and the lower output 548. When the spool 542 is above the neutral position, as shown in FIG. 3B, the pneumatic pressure flows from the input 550 through the upper output 546. The spool 542 also allows the pneumatic pressure in the lower output 548 to escape out through a lower vent 552. When the spool is below the neutral position, as shown in FIG. 3C, the pneumatic pressure flows from the input 550 through the lower output 548. The spool then allows pneumatic pressure in the upper output 546 to escape out through an upper vent 554.

Referring again to FIG. 2, a pressure regulator 524 controls pressure to a pressure modulator 212. A piston, diaphragm and spring 560, in conjunction with the pressure modulator 212, positions the spool 542 in the block 544. The pressure modulator 212 is a known electro-pneumatic device that physically moves the spool 542. The spool 542 moves up as the current to the pressure modulator 212 increases and moves down as the current decreases.

As already shown in FIG. 1, the inner-loop sensor 56 detects the position of the spool 542. Although several different types of position detecting transducers may be used, as shown in FIG. 2 one embodiment of this invention uses a linear output Hall-effect sensor 156 to detect the position of a magnet 561 mounted on the spool 542. The Hall-effect sensor is a transducer that responds with an output voltage if the applied magnetic field changes in any manner. A linear output Hall-effect sensor develops a voltage output proportional to the magnetic field and is used to sense relatively small changes in the magnetic field. Thus the voltage output of the Hall-effect sensor varies as the position of the magnet 561 changes in relationship to the position of the Hall-effect sensor 156. The circuits that detect the voltage output of the Hall-effect and produce the current to drive the pressure modulator 212 are described below.

Figure 4:
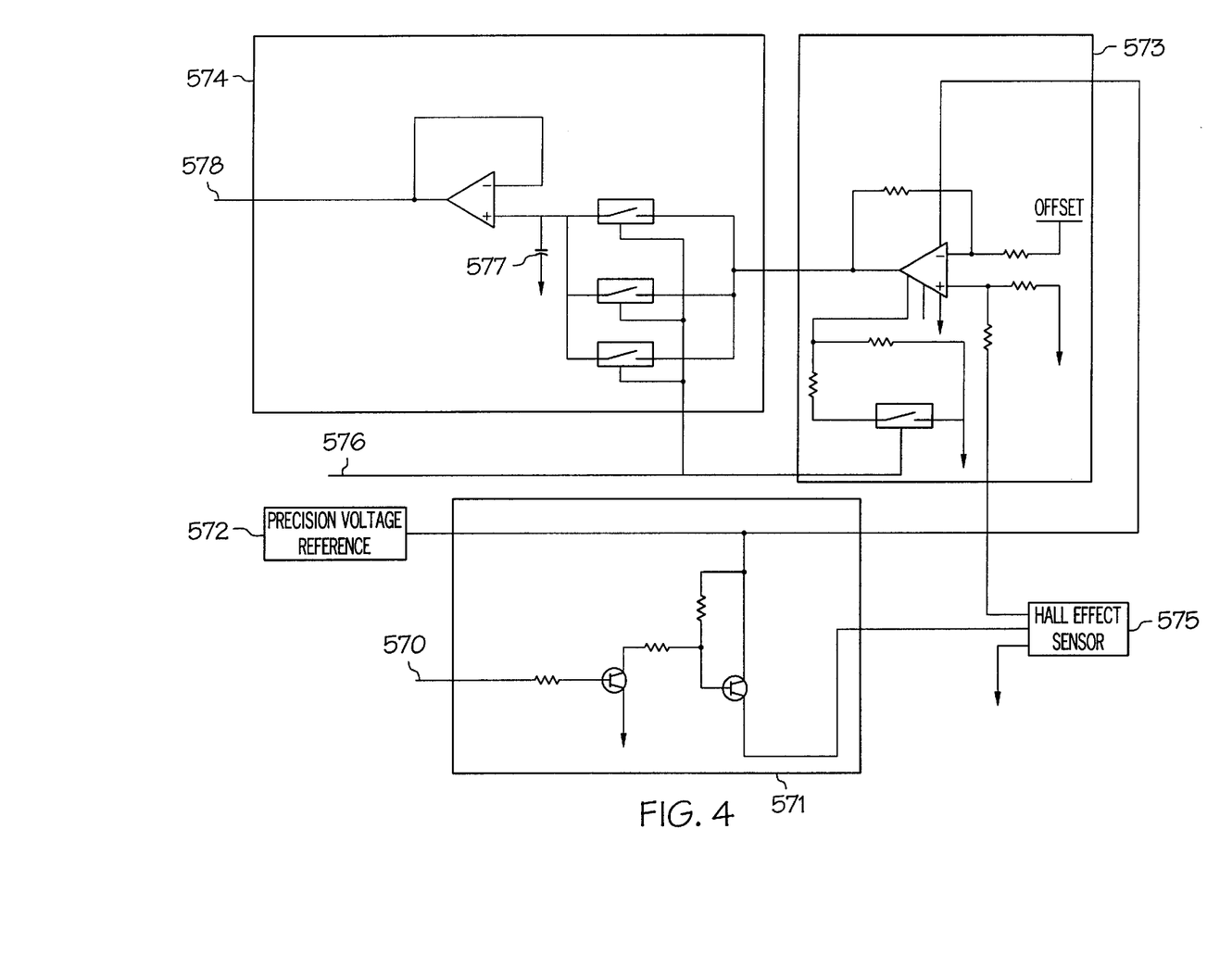
FIG. 4 shows a schematic of a Hall sensor circuit useful in the present invention.
Figure 5A:
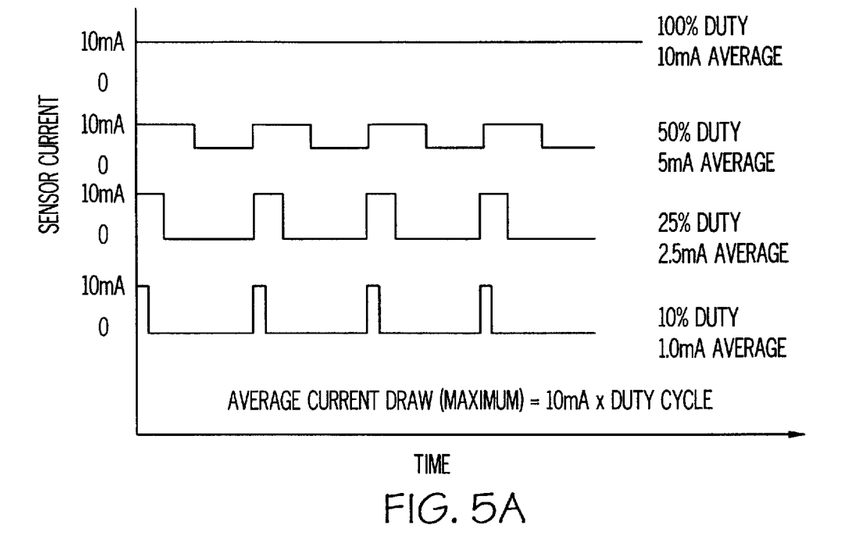
FIG. 5A is a graph which illustrates the average current draw of a Hall sensor for various applied duty cycles.

FIG. 4 shows a schematic of the Hall-effect sensor circuit which is a circuit for turning the Hall-effect sensor power supply on and off. A typical Hall-effect sensor draws an average of 5 milliamperes, with a 10 milliampere maximum. With the standard command signals now used, this current draw cannot be supported by a loop-powered device. The maximum 10 milliampere is almost a hundred percent of the available current. However, as shown in FIG. 5A, if the Hall-effect sensor is only turned on momentarily and then turned off, the average current draw becomes a factor of the applied duty cycle. For example, a 1/64 duty cycle would reduce the current draw by a factor of 64. Therefore, the maximum 10 milliampere current draw would be reduced to 156 microampere, a small draw on the command signals used in these circuits.

As shown in FIG. 4 for circuit 571, a digital control signal 570 governs the duty cycle. By generating timing pulses 570 by a micro-controller, this circuit eliminates the need for external parts. However, the timing pulses and sampling frequency can also be controlled by a software program or other pulse producing circuits outside of the valve control system.

An operational amplifier circuit 573 of FIG. 4, conditions the output of the Hall-effect sensor 575. Circuit 572 of FIG. 4 is a precision voltage supply for the Hall sensor.

An operational amplifier circuit 574 of FIG. 4, is a sample and hold circuit. When a digital control signal lead 576 is high, the output from the Hall-effect sensor is sampled and Hall-effect sensor output voltage is held on capacitor 577. When the signal on lead 576 is low, the capacitor 577 holds the Hall-effect sensor output voltage until the next sample pulse. If the Hall-effect sensor output is sampled at a rate faster than the actuator outer-loop can respond, the Hall-effect sensor uses less power, but increased position performance is still gained with negligible delay of the valve control system's response time. If the sensor output voltage is held after each sample, stable spool position is possible.

Figure 5B:
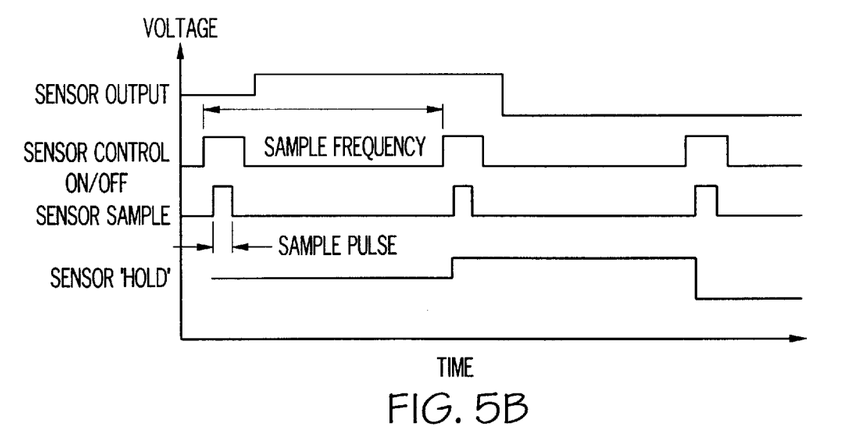
FIG. 5B is a graph which illustrates the output of a Hall sensor, sampling cycles and the output of a sample and hold circuit.

The top line of FIG. 5B, labeled "sensor output", shows a sample output of a Hall-effect sensor having a continuous duty cycle. The second line, labeled "sensor control ON/OFF" shows the time pulse generated by the digital control circuit 571 of FIG. 4. This is the actual time that the Hall-effect sensor is on. The third line in FIG. 5B, labeled "sensor sample", shows the sample pulse generated on lead 576 of FIG. 4. As noted above, when lead 576 is high, the output from the Hall-effect sensor is sampled. The bottom line in FIG. 5B, labeled "sensor 'hold'", represents the output of the sample and hold lead 578 of FIG. 4. The sensor "hold" output line, representing the output of the sample and hold circuit, is similar, although slightly delayed, to the sensor output line representing the output of a continuously operating Hall-effect sensor. However, if the Hall-effect sensor output is sampled at a rate faster than the actuator outer-loop can respond, the sample and hold output is sufficient to properly position the spool. In practice, such a result is easily obtained. Since electrical circuits respond so much faster than do the mechanical portions of the valve control system, a small delay in the signal output causes negligible delay in the performance of the valve control system. In the innovations in this present invention, the mechanical response times are speeded up so that the gain is far greater than any electrical circuit delay.

Figure 6:
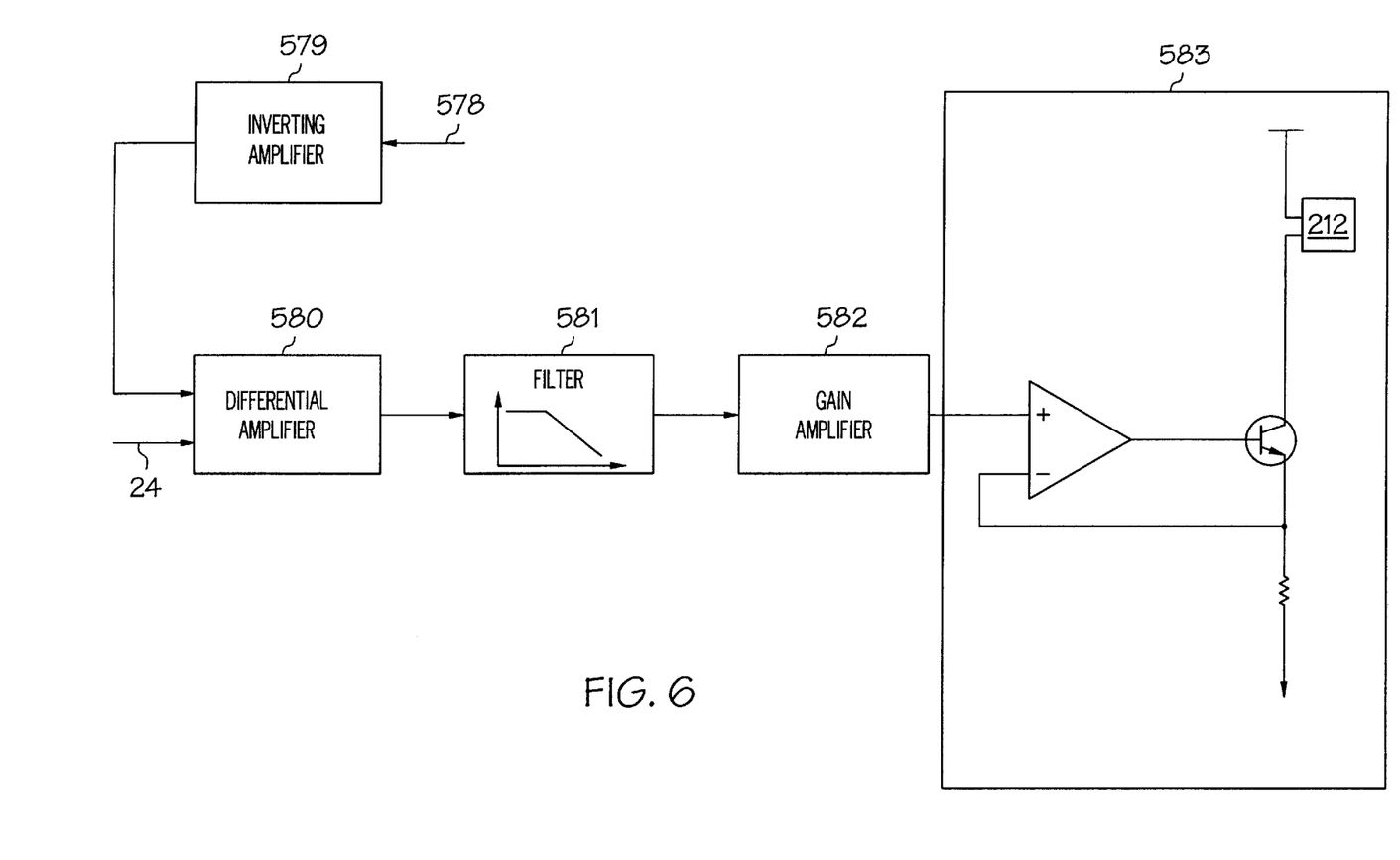
FIG. 6 is a schematic diagram of an inner-loop circuit made in accordance with the present invention.

The output from the sample and hold circuit 574 of FIG. 4 is developed on lead 578, and this is the input into an inverting amplifier 579 of FIG. 6. The inverting amplifier circuit 579 (FIG. 6) inverts the output of the sample and hold circuit so that the control signal polarity is correct. That is, when the spool is going up, voltage increases. When the spool is going down, voltage decreases. Without circuit 579, the change in voltage would be reversed. Other embodiments of this invention could easily omit the circuit 579 from the circuit design.

Circuit 580 of FIG. 6 is a differential amplifier circuit. This circuit compares the control input 24 and the Hall-effect sensor output. The control input is the command signal specifying the desired location of the spool. The output of the differential amplifier circuit 580 is filtered by filter 581 and supplied to the fixed-gain multiplier circuit 582. The fixed gain multiplier circuit 582 multiplies the output of 581 by a constant gain and supplies the multiplied gain to circuit 583 of FIG. 6, the current source for the pressure modulator 212 described above. The rate that the spool moves is governed by the proportional gain of the gain multiplier circuit 582.

The current source circuit 583 produces a current proportional to the output from circuit 582. This current source drives the pressure modulator 212. As described above, the pressure modulator is an electro-pneumatic device that physically moves the spool. Again, the spool moves up as the current increases and moves down as the current decreases.

In summary, the digital control circuit 571 of FIG. 4 applies power to the Hall-effect sensor 575. When the digital control pulse 576 is generated, the sample and hold circuit 574 captures the Hall-effect sensor output. The inner-loop compares this Hall-effect sensor reading showing the actual position of the spool with the desired position of the spool described by the control input 24 (FIG. 6). If there is a difference, the current source is adjusted up or down to move the spool. As noted above, the rate that the spool moves is governed by the proportional gain circuit 582.

Circuit 571 of FIG. 4, shows bipolar junction transistors BJT but those skilled in the art could devise timing circuits using other electrical components such as the field-effect transistors, MOSFETs, or JFETs.

The following examples illustrate the operation and advantages of this invention.

Example 1: The valve control system receives a 20 milliampere command signal 26 representing that the valve should be in the fully open position. The outer-loop sensor 12 detects that the valve 14 is in a fully closed position. The command circuit 30 compares the outer-loop feedback signal 22 to the command signal 26 and generates a correction signal 28.

The spool command circuit receives the correction signal after the correction signal is processed through the P.I. control 32. The modified correction signal tells the spool command circuit that the valve must be opened. This means that the spool 542 should be in the low position shown in FIG. 3C. The spool, however, may be in one of the three positions illustrated in FIGS. 3A, 3B, and 3C, depending on the prior command signals and on the prior location of the valve. If the prior signals required the valve to be opened and the valve had been closed, the spool would already be in the low position, and the spool command circuit would generate a zero spool correction signal and the spool would remain in the low position. If the prior signals required the valve to be closed and the valve was already closed, the spool would be in the neutral position shown in FIG. 3A and the spool command circuit would generate a spool correction signal to move the spool to the low position. If the prior signals required the valve to be closed and the valve had been opened, the spool would be in the high position shown in FIG. 3B and the spool command circuit would then generate a spool correction signal to move the spool to the low position.

Example 1 illustrates several features of the valve control system. First, there is a time lag between the receipt of the command signal and the positioning of the valve in response to the new command signal. For example, if the command signal was a step increase from 4 milliamperes to 20 milliamperes and the valve was fully closed when the command was received, there may be a several second delay until the valve moves to a fully opened position. This delay is called the response time. Most of the response time is due to the delay caused by the operation of the mechanical systems, that is, the movement of the spool, the movement of pneumatic pressure through the block and spool 54, and the movement of the piston 16. The time response due to the processing of the electrical signal through the control circuits is negligible in comparison.

A second feature is that the electrical circuits have no memory. For example, if the command circuit receives a 10 milliampere command signal, the command circuit does not remember whether the prior command signal was 5 milliamperes or 15 milliamperes. Therefore, the command circuit does not know, without the feedback loop, whether the valve should be opened or closed to conform with the command.

A third feature is that the location of the spool and the valve is dependent on the prior history rather than on the current command signal. This is of course due to the delay caused by the response time.

Example 2: The valve control system receives a 15 milliampere command signal 26 representing that the valve should be 70% open. The outer-loop sensor detects that the valve is in fact 70% open. Therefore, the command circuit generates a zero or neutral correction signal 28. A zero correction signal tells the spool command circuit that the valve should be in the neutral position shown in FIG. 3A. The spool, however, may again be in one of the three positions illustrated in FIGS. 3A, 3B, and 3C, depending on the prior command signals and on the prior location of the valve. If the spool is in the low position, the spool command circuit would generate a correction signal to move the spool up to the neutral position. If the spool is already in the neutral position, the spool command circuit would generate a neutral spool correction signal and the spool would remain in the neutral position. If the spool is in the high position the spool command circuit would generate a spool correction signal to move the spool down to the low position.

Compare the results of Example 2 using the present invention to the prior art valve control systems without an inner-loop. If the prior art valve control system receives a command signal representing that the valve should be 70% open and the outer-loop sensor detects that the valve is in fact 70% open, the prior art command circuit would generates a zero or neutral correction signal (as did the present invention.) However, in the prior art valve control system, without the inner-loop, the zero correction signal goes directly to the spool. A zero correction signal means that the spool should not move, but should remain at the status quo position.

In the prior art, if the spool is the high position, it would remain in the high position. If the spool remains in the high position, the valve will continue to close until the outer-loop sensor detects that the valve is less than 70% open. Then the command circuit will generate a correction signal to open the valve. This command will cause the spool to move to the low position. In the low position, the valve will start to open and will continue to open. When the valve is 70% opened, the command circuit will again generate a zero correction signal. However, since the spool does not move in response to a zero correction signal, it will remain in the low position. Thus, the valve will continue to open until the valve is more than 70% opened. The command circuit will then generate a correction signal to close the valve and the spool will move again to the high position. Thus, the valve will oscillate around the 70% open position until a new command signal is received.

Example 2 illustrates several more features of the present invention. First, the valve control system with the inner-loop will hold a the valve in a steady partially opened position, unlike the prior art control systems without the inner-loop that would continually oscillate the valve across a range of valve positions. Thus, the present invention has improved position control over the prior art. Second, in the prior art control systems without the inner-loop, once the valve moves, the spool will never or only sporadically and unpredictably return to the neutral position.

Example 3: The valve control system receives a 20 milliampere command signal representing that the valve should be in the fully open position. The outer-loop sensor detects that the valve is in a fully closed position and the spool moves to, or remains in, the low position and the valve moves to the fully opened position as described in. Example 1. The outer-loop sensor then detects that the valve is in a fully closed position and the command signal generates the zero or neutral correction signal.

In the valve control system with an inner-loop, the spool will move to the neutral position. However, in the prior art valve control systems without the inner-loop, the spool will remain in the low position. The valve control system then receives a 4 milliampere command signal representing that the valve should be in the fully closed position. The valve control system with an inner-loop will have a faster response time to the new command because the spool needs to move only from the neutral position to high position. However, the prior art valve control system, without the inner-loop, will need to move the spool from the low position to the high position.

In a prior art system, subject to a partially open signal as described in Example 2, the response time would be less certain as the spool oscillates from the high position to the low position. In half the oscillating cycle, the response delay due to the positioning of the spool would be zero since the spool is already at the desired position. However, half the time the response time would be higher since the spool would need to move from the high to the low or the low to the high position. Since it would be difficult to predict when the spool would be in the low or high position, those operators using the prior art system would need to design the control signal for the worst case time response rather than the best.

It is to be understood that the above-described arrangements are only illustrative of the application of the principles of the present invention. Numerous modifications and alternative arrangements may be devised by those skilled in the art without departing from the spirit and scope of the present invention. The appended claims are intended to cover such modifications and arrangements.

What is claimed is:

1. A spool control system for positioning a spool in response to a correction signal, the spool being slidably disposed within a block to direct pneumatic pressure and the correction signal being an electrical signal whose level represents the desired position of the spool, the spool control system comprising spool sensor means for detecting the present position of the spool and generating an electrical inner feedback signal whose level represents the present position of the spool, spool movement command means for comparing a received correction signal to the inner feedback signal to generate an electrical spool positioning signal, spool positioning means responsive to the spool positioning signal for moving the spool within the block a distance represented by the spool positioning signal, a means for periodically supplying power to the stool sensor means to enable periodic sensing of the present position of the spool, and a sample and hold circuit operative to maintain the level of the inner feedback signal between periodic samples.

2. The spool control system of claim 1 wherein the spool sensor means includes a magnet mounted on the spool, and a Hall-effect sensor mounted adjacent the spool to detect position of the magnet and thus position of the spool.

3. The spool control system of claim 1 wherein the periodic sensing frequency may be varied.

4. A spool control system for positioning a spool in response to a correction signal, the spool being slidably disposed within a block to direct pneumatic pressure and the correction signal being an electrical signal whose level represents the desired position of the spool, the spool control system comprising a spool sensor operative to detect the present position of the spool and generate an electrical inner feedback signal whose level represents the present position of the spool, a spool movement controller operative to compare a received correction signal to the inner feedback signal to generate an electrical spool positioning signal, a spool positioning controller responsive to the spool positioning signal operative to move the spool within the block a distance represented by the spool positioning signal, a periodic power supply coupled to the spool sensor to enable periodic sensing of the present position of the spool, and a sample and hold circuit operative to maintain the level of the inner feedback signal between periodic samples.

5. A valve system comprising:

a fluid passage;

a valve positioned in said fluid passage and operative to regulate the flow of fluid through said fluid passage;

a valve actuator coupled to said valve;

a spool mechanism coupled to said valve actuator;

a spool sensor operative to detect the present state of the spool and generate an inner feedback signal representing the present state of the spool;

a spool movement controller operative to compare a received correction signal to said inner feedback signal to generate a spool positioning signal, a spool positioning device responsive to the spool positioning signal and operative to alter a position of the spool in accordance with the spool positioning signal, a power supply coupled to the spool sensor and operative to cause said spool sensor to periodically sense the present position of the spool, and a sample and hold circuit operative to maintain the level of the inner feedback signal between periodic samples of the present position of the spool.

* * * * *

UNITED STATES PATENT AND TRADEMARK OFFICE
CERTIFICATE OF CORRECTION

PATENT NO : 5,884,894
DATED : March 23, 1999
INVENTOR(S): Brian Smith

It is certified that error appears in the above-identified patent and that said Letters Patent is hereby corrected as shown below:

Col. 8, Line 53, "to the stool sensor . . . "; should read - - to the spool sensor - - .

Signed and Sealed this

Eighteenth Day of January, 2000

Attest:

Q. TODD DICKINSON

*Attesting Officer*  *Commissioner of Patents and Trademarks*